INVENTOR
JOHN J. MARTIN
BY Richard J. Myers
ATT'Y.

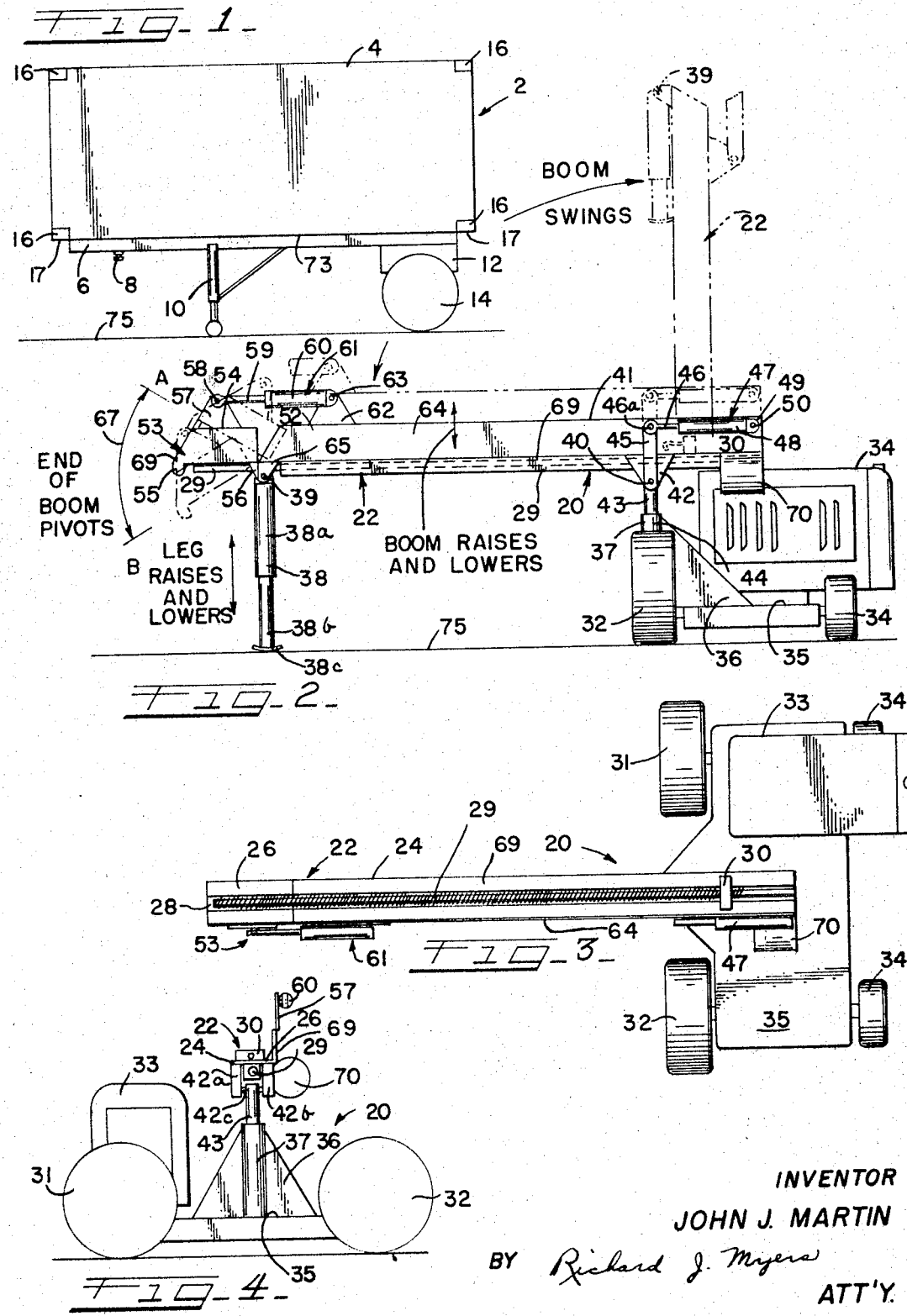

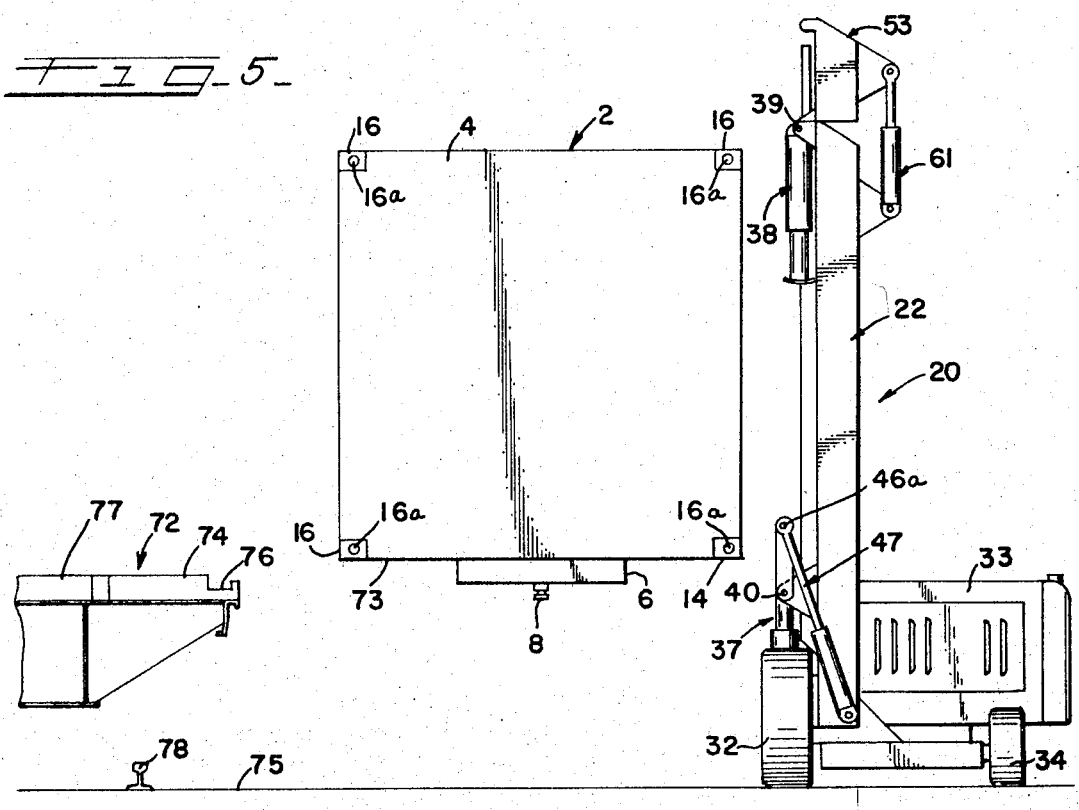
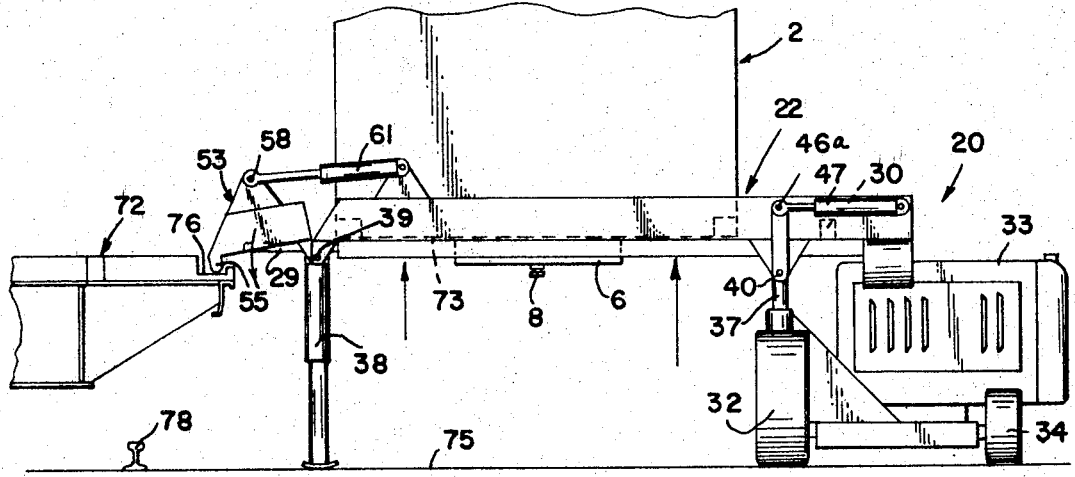

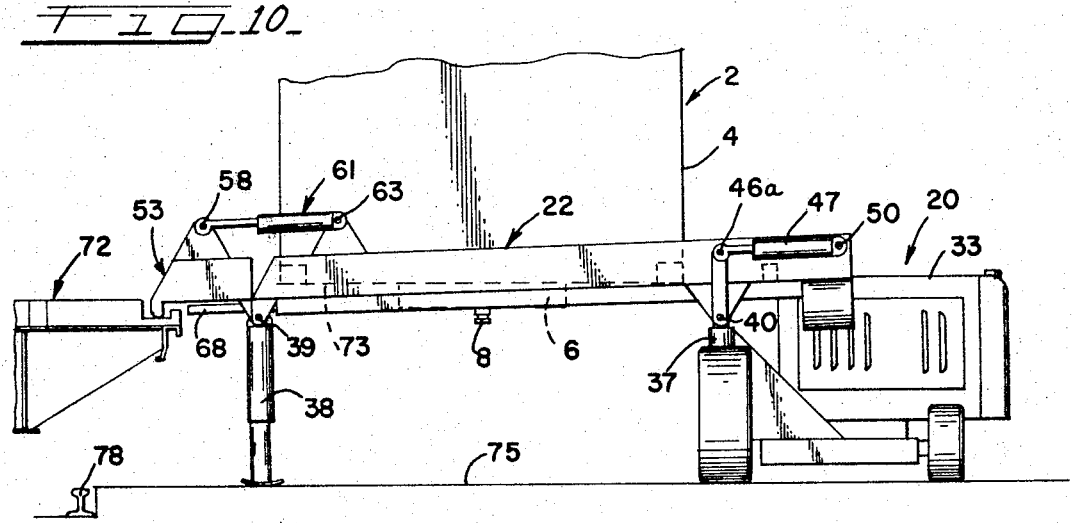
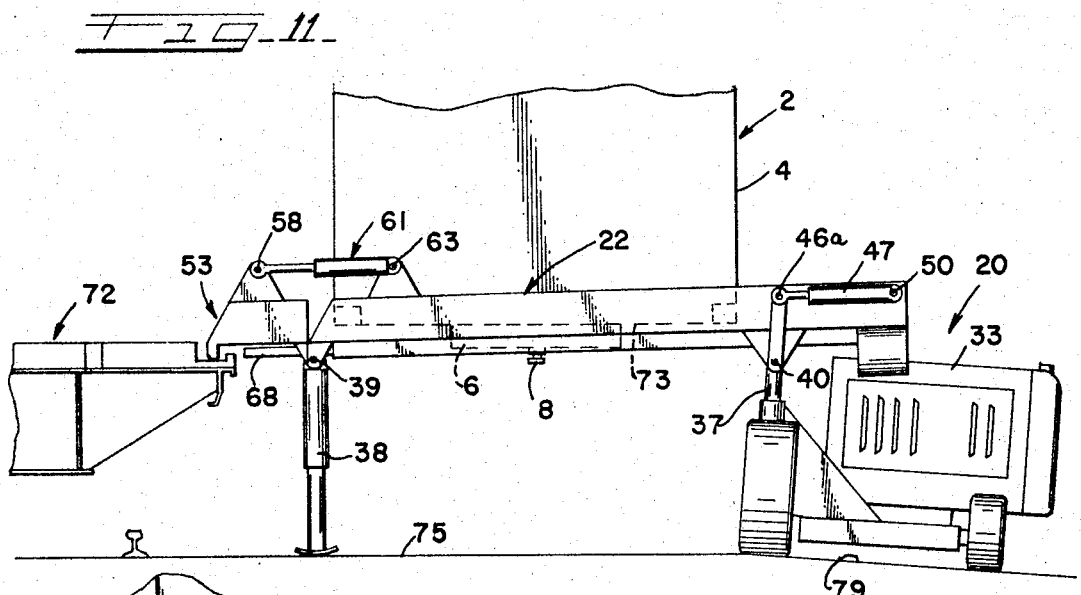
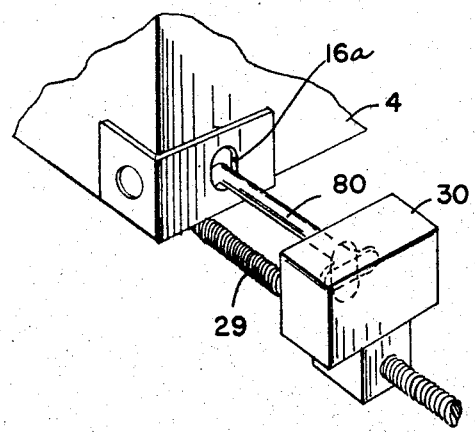

United States Patent Office 3,454,173
Patented July 8, 1969

3,454,173
CONTAINER SIDE LOADING SYSTEM AND
MEANS THEREFOR
John J. Martin, Warminster, Pa., assignor to Pullman
Incorporated, Chicago, Ill., a corporation of Delaware
Filed Dec. 29, 1966, Ser. No. 605,891
Int. Cl. B65g 67/02; B60p 1/44, 1/48
U.S. Cl. 214—38                         10 Claims

ABSTRACT OF THE DISCLOSURE

A container side loading system having a pair of self-propelled side loaders, each having a swingable boom with a container supporting platform for shifting the container from the trailer chassis sideways to the side of the railroad car and to return the container back to the trailer, the side transfer device or loader being provided with pivotal structure for adjusting its connection with the railroad car regardless of the height of the railroad car or trailer or the variation in elevation of the ground upon which either the car, side-loader or trailer is located, the boom and container platform structure of the side loader being swingable from a vertical out-of-way position to a horizontal in-use position.

Background of invention—field of invention

This invention relates generally to means for transferring of a container from a trailer or other vehicle by means of a transferring device to a railroad car or other vehicle. In transferring a container, box or the like from one vehicle to another or to a storage area there is required a transfer device which is simple in construction, operates efficiently, operated by a minimum amount of personnel, and is able to be operated in confined areas.

Summary

This invention relates to a container side loading system whereby the container may be transferred from a vehicle, such as a trailer, to another vehicle such as a railroad car and in particular uses a pair of self-propelled side loading container transferring units whereby each transfer unit or dolly has a container support boom which is operable between a vertical transport position to a horizontal container support position whereby each boom straddles a respective end portion of the container, raising the container off of the trailer chassis and shifting it by means of a drive screw type shuttle on each boom onto the railroad car. Such an arrangement permits loading and unloading of varied size containers and permits transport movement of the dollies in confined areaways as the transfer elements of the dollies may be positioned vertically, and each dolly has suitable structure which may be pivoted for coupling to the vehicle such as a railroad car to compensate for uneven ground between the trailer and the car as well as any differences in height between the railroad car and the trailer. The invention has also for its purpose, objective and advantage the use of two side loaders, each working from the end of the container in unison and each side loader having a boom adaptable for working at either end of the container so that matched pair of vehicles is required. The invention has the further object, advantage and purpose of providing for a side loader of the type that has a boom that is swingable from an out-of-use vertical position to an in-use horizontal position through operation of hydraulic rams.

This invention further provides for a side transfer device that may be adjusted vertically or horizontally in order to accommodate transfer of a container from one vehicle to another. These and other advantages and objects and purposes of the invention will become more apparent when reference is had to the following description and attached drawings.

Description of drawing

FIG. 1 is a side elevational view of a trailer having a container and chassis;

FIG. 2 is a front elevational view of the novel side loader of the invention;

FIG. 3 is a top plan view of the novel side loader of the invention;

FIG. 4 is a side elevational view of the novel side loader of the invention;

FIGS. 5 through 8 are views illustrating the transferring of a container from one vehicle to another where the vehicle surface to receive the container is at a lower elevation than that of the other vehicle;

FIGS. 9 and 10 are views illustrating the transfer of a container using the novel side loader, from a first vehicle to a second vehicle where the first vehicle container support is at a lower elevation than that of the second vehicle;

FIG. 11 is a view showing the transfer of a container by means of the novel side loader from one vehicle to another where the one vehicle is on uneven ground; and FIG. 12 is a partial view of the container corner casting and the side loader shuttle means connected with means for moving the container.

Description of the preferred embodiment

Figure 7:
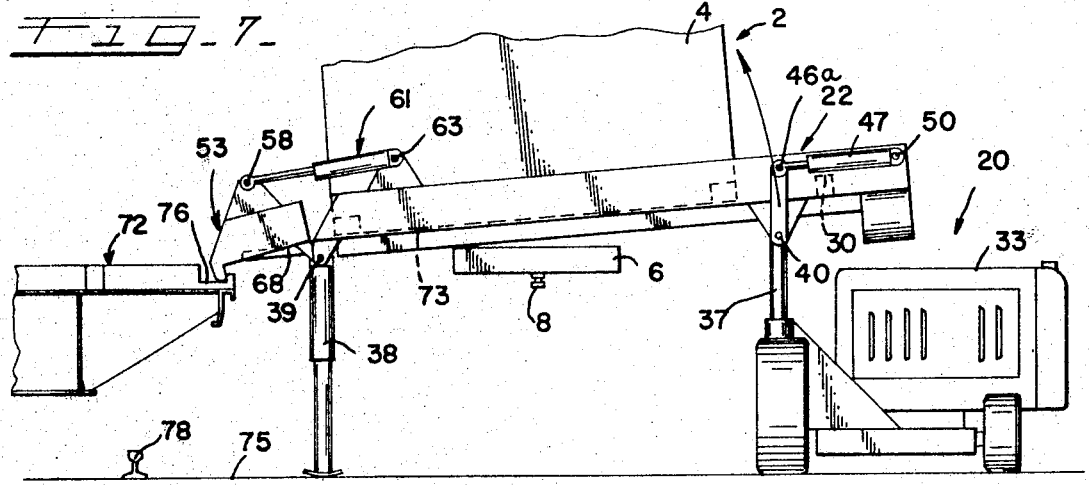

With reference now to the drawings and in particular with reference to FIG. 1, there is shown a trailer 2 which comprises a container 4 mounted on a chassis 6 provided with a kingpin 8 and landing gear structure 10 and a bogie arrangement 12 including wheels 14. The container 4 is provided with eight corner castings 16 which are part of the extension of the ends of the container 4 beyond the chassis 6. The chassis 6 is short at the front and rear to permit the use of the below described side loader units, such as the side loader unit 20 as shown in FIG. 2, to lift the container 4 from its chassis when suitable connecting means in the container 4 and on the chassis 6 are removed, as is conventional and well known in the art. With reference now to FIGS. 2 to 4 there is shown a side loader or side transfer device 20 which is provided with a swingable boom 22. In lifting the container off of its chassis, two such side loaders 20 are required and the platform portion 24 of boom 22 of each loader nestles in the recess 17 at the front or rear of the trailer as defined by the overhang portion of the container 4 and the end of the chassis 6. The respective top platform surface 26 of the boom engages a respective under surface portion 17 conjunctively with another side loader to raise the container above the chassis sufficiently to move the container away from the chassis in a sidewise movement.

The boom 22 of the side transfer device or side loader 20 comprises the container raising platform 24 having a top surface 26 provided with a recessed channel or groove 28 containing the shuttle drive screw 29 extending longitudinally therethrough and carrying atop thereof the push-pull shuttle 30 for engaging and moving a container across the platform 24 to be later explained. The side loader vehicle 20 is further provided with drive wheels 31 and 32, engine 33 and fore and aft dolly wheels 34, 34 and an operator platform 35 carrying suitable upright supporting structure 36 for carrying the main hydraulic ram unit 37 for raising and lowering the boom 22 as seen in FIG. 2 in conjunction with the operation of hydraulic ram unit 38 at the other end and supporting the other end of the boom 22, the hydraulic unit 38 being pivotally attached at 39 to the boom structure 22, while the hydraulic unit 37 pivotally supports at 40 the other end 41 of the boom structure 22 by the boom plate 42 being pivotally connected at 40 to the hydraulic ram 43 of the ram unit 37 which also has the hydraulic cylinder 44. The hydraulic ram 43 of the ram unit 37 has a portion 45 extending above the pivot 40 which pivotally connects at 46a to hydraulic ram 46 of the ram unit 47 which has a cylinder 48 and is pivotally connected to the corner 49 of boom platform 26 at 50 of the boom 22. Thus the hydraulic ram extension 45 can be extended upwardly and therefore pivot the end 49 of the boom upwardly while the ram rod 46 of ram unit 47 may be extended outwardly of its cylinder 48 to allow the boom 22 to be pivoted about pivot point 40 to the dotted line position shown in FIG. 2 or also as shown in FIG. 5 where the hydraulic ram 47 is in the extended position and the boom unit 22 in the upright position or vertical position. The hydraulic jack 38 comprises a cylinder 38a and a ram piston 38b having a ground engaging foot 38c and when the boom unit 22 is placed in the upright or vertical position the ram unit 38 swings about its pivot 39 to hang downwardly in a vertical position along the side of the boom 22. At the outer boom end 52 there is provided boom pivot means 53 which includes an arm 54 having a toe or hook end 55 for engaging with a vehicle such as a railroad car 72 to which the container 4 will be transferred as described below. This end structure 53 is pivotally attached at 39 by its arm 56 and has an upper plate 57 which at pivot 58 is connected to hydraulic ram 59 slideable in ram cylinder 60 in hydraulic ram unit 61 which is pivotally mounted to plate 62 at pivot 63, the plate 62 being mounted on the boom platform portion 64 which carries the plate 65 having the pivot 39 for the hydraulic jack 38 and the end boom pivot plate structure 53. It will be noted in FIG. 2 that the end boom pivot means 53 is moved from one position A to another position B as shown by arrows 67. The various hydraulic units on the transfer device 20 are operated through hydraulic pump means (not shown) which is driven by the engine 33 in the usual manner.

Thus it is seen that the side transfer device 20 is provided with a boom 22 that has an end pivot structure 53 that is operated hydraulically and further that the boom structure is supported by hydraulic jacks 38 and 37, the latter hydraulic unit 37 being supported by gusset structure 36 on the platform 35 of the unit 20 while the other hydraulic leg 38 is swingable to an out-of-use position when the boom is raised to a vertical position as shown in FIG. 2. The side loader 20 is also provided with a shuttle drive screw means for operating the shuttle. It is to be noted that the boom platform 26 is provided with the first upright elongated wall 64 and the wall 69 against which the container may come to rest. The portion 54 of vertical wall 69 forms part of the pivotal end boom pivot structure 53 while the wall 68 extends below the pivot means 53. The hydraulic motor 70 operates the drive screw 29. It is noted that the gusset structure 42 comprises a trunnion part 42a and a trunnion part 42b and a pin 42c which is pivotally attached to the hydraulic ram means 37 for pivotal movement thereabout as seen in FIG. 4.

Figure 8:
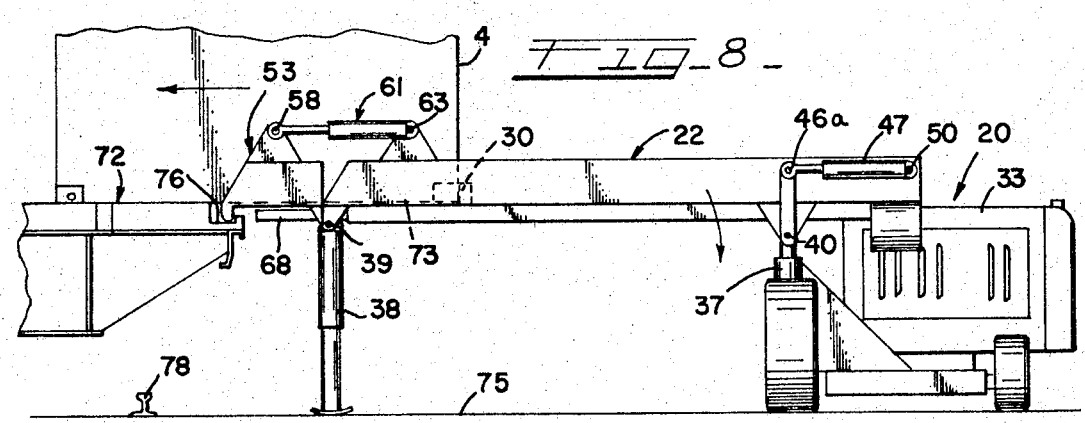

With reference now to FIGS. 5, 6, 7 and 8 there is shown a system for loading of the container 4 on a railroad car 72 from the trailer 2 by the use of the transfer device 20 where the bottom 73 of the container 4 is above the top 74 of the railroad car 72 but where the transfer device 20, the trailer 2 and the railroad car 72 are all on flat or level ground 75. As seen in FIG. 5, the side loader 20 has its boom 22 in the elevated out-of-use position and in order to transfer the container 4 to the railroad car 72 the boom 22 must be lowered to the horizontal position by operating the hydraulic unit 47 to swing the platform 24 down to the horizontal position, allowing the hydraulic leg 38 to swing down in depending fashion from the boom 22. Next the hydraulic jacks 38 and 37 are operated to raise the boom 22 to a proper horizontal level where the end boom pivot means 53 has its toe or bight portion 55 disposed over the groove at 76, the top side of the railroad flat car 72. The boom 22 is raised to approximately the level of the bottom 17 of the container. It will be appreciated that this operation of the side loader takes place at the front or left side of the trailer as viewed in FIG. 1 while another loader operates in the same manner at the rear or right side of the trailer. That is, two side loaders 20 are required to make the transfer from the trailer structure to the railroad car structure, each side loader working from one end of the container. The loaders must work in unison and each boom must be adaptable for working at either end so a matched pair of vehicles is required. The container-on chassis trailer is within several feet of the railroad car side rail allowing room for the transfer crew to swing into position the transfer rails which may be a part of the rail car as in this instance is the member 77 having the groove 76. Next the pivot boom end 53 of each boom of each transfer device is pivoted into the pocket 76 on the railroad car 72. Then the hydraulic jack 37 is operated to extend the ram 43 upward pivoting the boom about its pivot 39 in a counter-clockwise direction as viewed in FIGS. 6 and 7. This results in raising the container off of the chassis 6 of the trailer 2 and the chassis 6 can remain or can be pulled away. Next the boom 22 is straightened by allowing the hydraulic jack 37 to lower the right end of the boom to where the boom becomes level or horizontal to the height of the railroad car. It will be appreciated that the boom 22 may be left slightly inclined to aid travel of the container toward the railroad car. The last step is to operate the shuttle 22 to push the container 2 onto the railroad car 72 as shown in FIG. 8.

Figure 9:
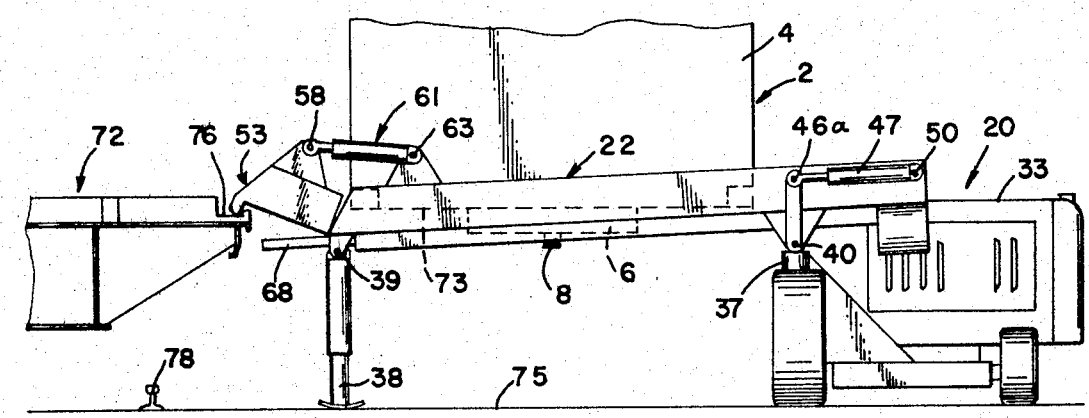

FIG. 9 is illustrative of a condition where the trailer chassis extends below the container support surface of the railroad flat car such that the boom must be lowered by lowering the left hydraulic jack 38 to lower the left end of the boom 22 to enable the boom platform 24 to get underneath the bottom of the container 4 and then the left jack 38 is extended to raise the left end of the boom 22 and the container above the flat top of the railroad car in order to have the shuttle 22 to push the container 4 onto the railroad car 72 as was required where the container 4 was elevated above the bed of the flat railroad car. In either situation shown in FIGS. 5 through 8 or in FIG. 9 the rail 78, the bottom 38c of the jack 38 and the wheels 30 to 34 of the loader 20 all are on the same horizontal plane or ground 75. However, in FIG. 10 it is to be noted that the rail or track 78 of the railroad is below the bottom 38c of the jack unit 38 and the wheels 32 and 34 of the side transfer device 20, but the side transfer device 20 can still operate. Also, as shown in FIG. 11 by operation of the hydraulic units 38, 37 and 61 of the transfer device 20 the transfer operation can take place on an uneven surface such as surface 79. Further, if it is desired to transfer the container 4 from the railroad car 72 to the transfer device 20 for placing on the chassis 6 of a trailer 2 a tow link 80 may be passed through the opening 16a in the corner casting 16 of the container 4 and have its other end pass through the opening in the pusher 30 whereby when the pusher 30 is retracted by means of its screw means 29 it will pull the container 4 back onto the side loading device 20 as shown in FIG. 12.

Also where the chassis of the trailer is below the railroad car flat deck the end pivot means 53 can hook into the groove 76 in the railroad car and then by actuating hydraulic jack 61 the end pivot means can lift up boom 22 in conjunction with the hydraulic jacks 37 and 38 to lift the container 4 into position for transferring the container to the railroad car.

It is therefore seen that this construction relates to the use of a pair of side loading transfer units for transferring a container from a trailer to a railroad car or vice versa whereby each dolly straddles a respective end of the container, raising the container off its chassis and lifting it with a drive screw type shuttle onto the railroad car. This arrangement permits loading and unloading of variable size containers in confined areaways since the transfer elements of the dolly 20 may be vertically positioned in order to transport the dolly to the unloading site and each dolly has a hydraulically controlled pivotal structure 53 for coupling the railroad car to compensate for uneven ground between the trailer and the car.

The foregoing description and drawings are given merely to explain and illustrate the invention, and the invention is not to be limited thereto, since those skilled in the art who have the disclosure before them will be able to make modifications and variations therein without departing from the scope of the invention.

What is claimed is:

1. A side load transfer device for transferring a container or the like from one vehicle to another comprising:
   a mobile frame structure,
   a boom structure pivotally mounted on said frame and swingable thereabout from an upright vertical position to a lowered horizontal position where said boom extends outwardly of said frame in outrigging fashion,
   said boom having a free end,
   vehicle coupling means pivotally mounted on said free end and adapted to be attached to a vehicle receiving the container,
   container support means on said boom and adapted to engage a container in the horizontal position of the boom attendant to transferring the container to the vehicle receiving the container,
   said frame and said boom of the side load transfer device having means to raise and lower the boom and having means to shift the boom horizontally outwardly of said vehicle,
   said boom having further means to pivot said couple means at the end of the boom, and
   shuttle means on the boom for moving a container stored on the container support means therealong between the load transferring vehicle and the load receiving vehicle.

2. A side loader having a swingable boom provided with a container support means,
   means to move said boom from a vertical out-of-use position and to a horizontal in-use position where said boom overhangs the side loader in cantilever fashion,
   means on the boom to move the container along the container support means between container supporting devices,
   said boom having a free end,
   said free end having pivotal coupling means being arcuately adjustable to couple the boom with a container support device.

3. A side loader having a swingable boom provided with a container support means,
   means to move said boom from a vertical out-of-use position and to a horizontal in-use position where said boom overhangs the side loader in cantilever fashion,
   means on the boom to move the container along the container support means between container supporting devices,
   said boom having a pair of vertically adjustable support means,
   said pair of support means comprising a first vertically adjustable leg adapted for engagement with the ground and located at the free end of the boom, and
   a second vertically adjustable leg being mounted on said side loader.

4. The invention according to claim 3, and means for vertically adjusting each of said legs.

5. The invention according to claim 2, and said pivotal coupling means comprising a coupler pivotally connected to said free end and means mounted on said free end for moving said coupler in an arcuate path,
   said coupler having a connecting portion for coupling with a container support device.

6. A side loader having a swingable boom provided with a container support means,
   means to move said boom from a vertical out-of-use position and to a horizontal in-use position where said boom overhangs the side loader in cantilever fashion,
   means on the boom to move the container along the container support means between container supporting devices,
   said means to move the boom from a vertical to a horizontal position comprising,
   a boom support mounted on said side loader,
   said boom support having a first vertically extendible arm,
   a second horizontally extendible arm mounted on the boom and being connected with said first arm, and
   means coupling said first arm with said boom for swinging the boom in an arcuate path between vertical and horizontal positions.

7. The invention according to claim 6, and said means connecting the boom to the first arm being vertically spaced between the boom support and the second arm.

8. A side loader having a swingable boom provided with a container support means,
   means to move said boom from a vertical out-of-use position and to a horizontal in-use position where said boom overhangs the side loader in cantilever fashion,
   means on the boom to move the container along the container support means between container supporting devices,
   said means to move the boom from a vertical to a horizontal position comprising:
   a vertically adjustable leg mounted on the loader and pivotally connected with said boom,
   a horizontal extendible arm pivotally connected with said leg and said boom, and
   means for imparting horizontal extension to said arm.

9. A side loader having a swingable boom provided with a container support means,
   means to move said boom from a vertical out-of-use position and to a horizontal in-use position where said boom overhangs the side loader in cantilever fashion,
   means on the boom to move the container along the container support means between container supporting devices,
   said means to move the boom from a vertical to a horizontal position comprising:
   an extendible leg being connected between the loader and the boom and an extendible arm pivotally connected to the boom and to said leg.

10. The invention according to claim 9, and said boom having an extendible ground engaging leg supported on its free end.

References Cited

UNITED STATES PATENTS

| | | | |
|---|---|---|---|
| 2,004,095 | 6/1935 | Hankins et al. | |
| 2,926,797 | 3/1960 | Decker. | |
| 3,297,182 | 1/1967 | Barry | 214—77 |
| 3,315,825 | 4/1967 | Scheinert | 214—75 |

ROBERT G. SHERIDAN, Primary Examiner.

U.S. Cl. X.R.

214—83.26, 502, 510